United States Patent [19]
Bettenhausen

[11] Patent Number: 5,913,338
[45] Date of Patent: Jun. 22, 1999

[54] LOOP PIPE AND METHOD OF MANUFACTURE THEREFOR

[76] Inventor: Roger V. Bettenhausen, 5 Lakewood Dr., Columbus, Nebr. 68601

[21] Appl. No.: 08/738,729

[22] Filed: Oct. 28, 1996

[51] Int. Cl.[6] ........................................................ F16L 9/00
[52] U.S. Cl. .................. 138/177; 138/DIG. 11; 138/178
[58] Field of Search ..................... 138/177, 178, 138/111, DIG. 11; 4/541.6

[56] References Cited

U.S. PATENT DOCUMENTS

| | | | |
|---|---|---|---|
| 4,689,839 | 9/1987 | Henkin et al. | 4/541.6 X |
| 4,899,712 | 2/1990 | De Bruyn et al. | 138/177 X |
| 4,998,754 | 3/1991 | Matsumoto et al. | 138/177 X |

*Primary Examiner*—Patrick Brinson
*Attorney, Agent, or Firm*—Emrich & Dithmar

[57] ABSTRACT

A loop pipe for redirecting a flowing fluid such as water 180° is formed by a casting process using a mold and includes a linear intermediate portion and first and second linear end portions each disposed on a respective end of the intermediate portion and forming a continuous inner channel for passing the fluid. The loop pipe is in the form of a single piece casting formed in a mold using three elongated, linear inserts which are removable from the casting once formed to provide the casting with the aforementioned continuous inner channel for re-routing the fluid 180°. The two end portions of the loop pipe are provided with connecting arrangements such as threads or barbs and the casting is adapted to receive a threaded plug to close the aperture through which the middle insert forming the linear intermediate portion of the loop pipe is removed from the casting. The loop pipe may be cast from plastic or any of the more commonly used metals such as iron, aluminum or zinc.

4 Claims, 2 Drawing Sheets

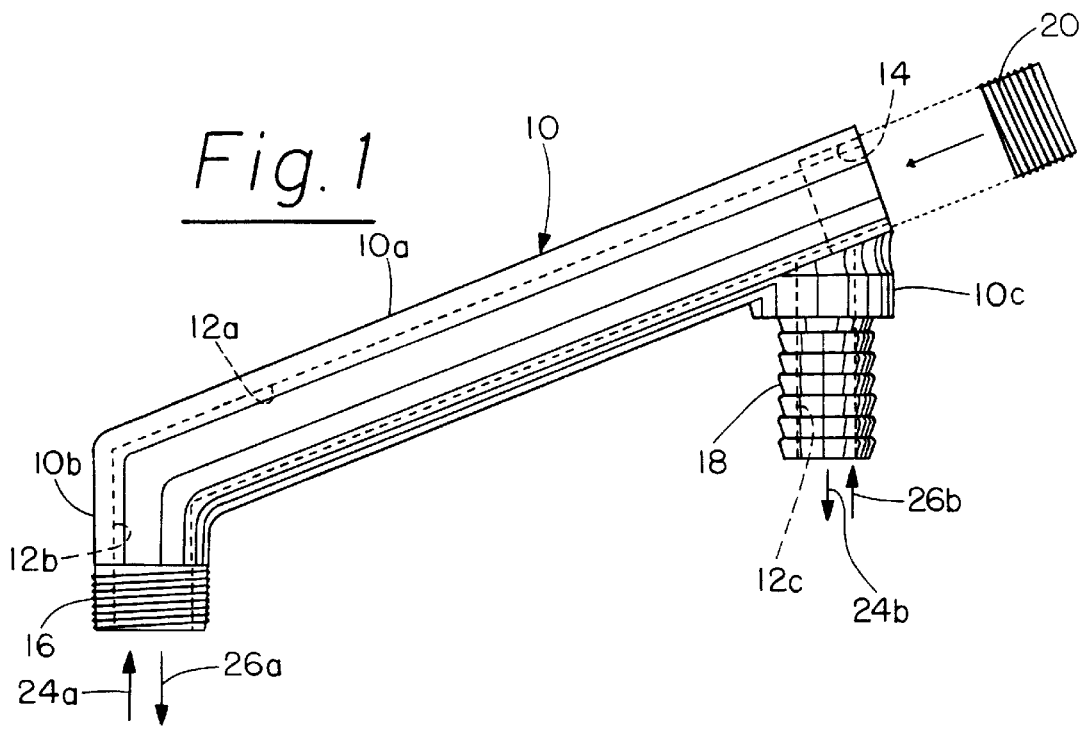
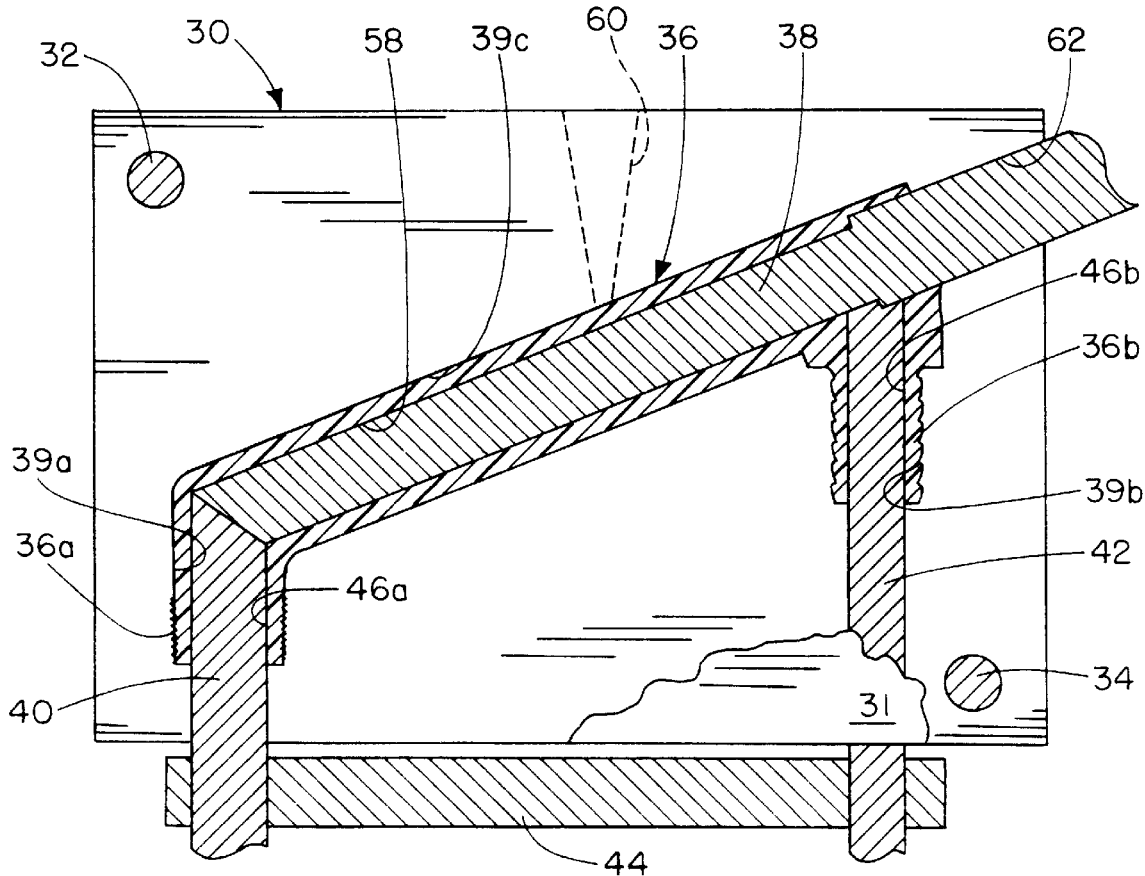

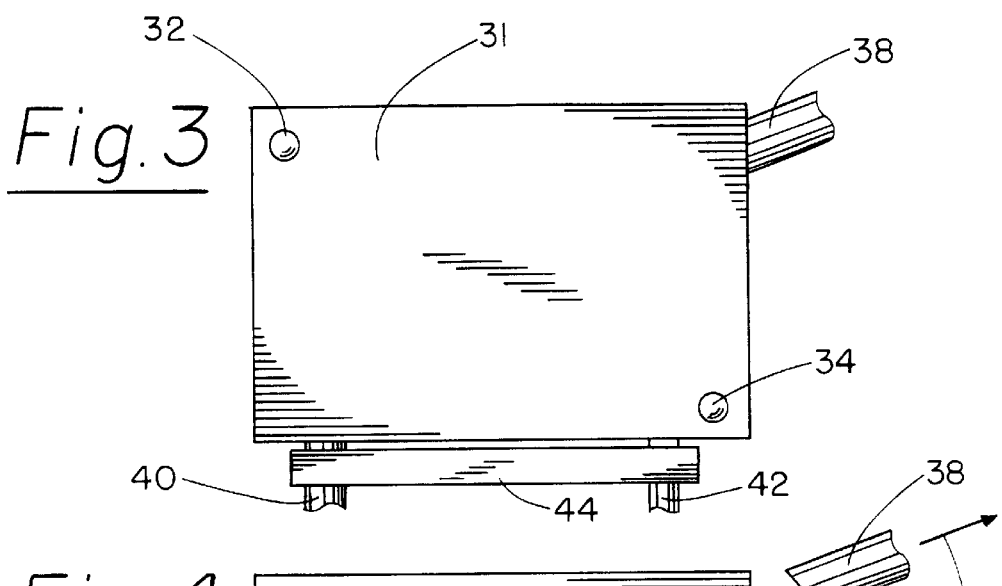
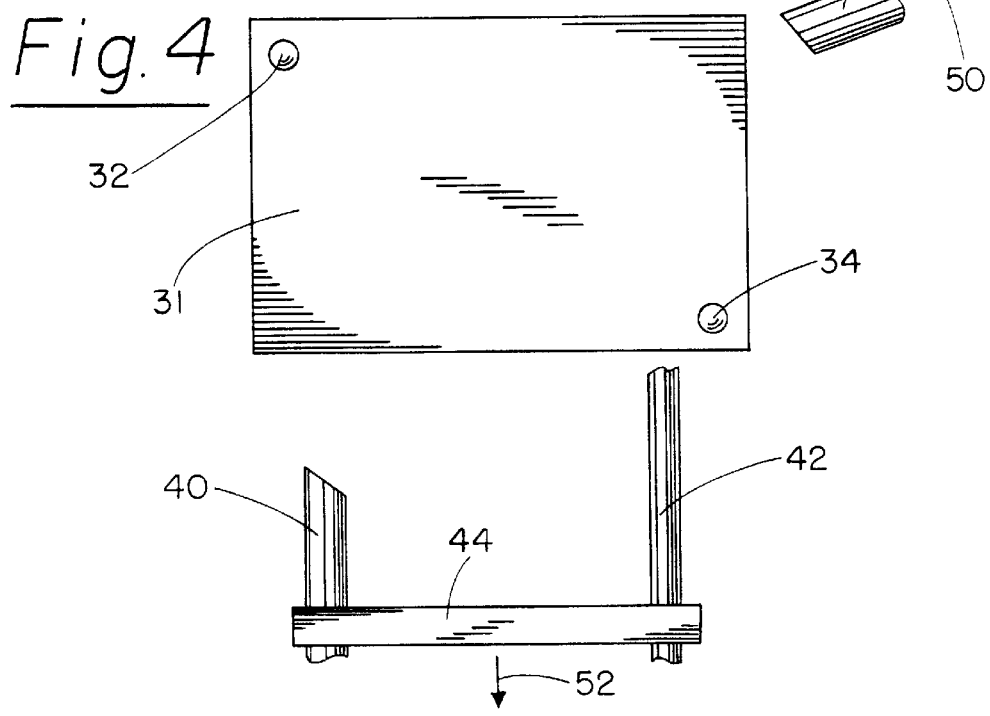
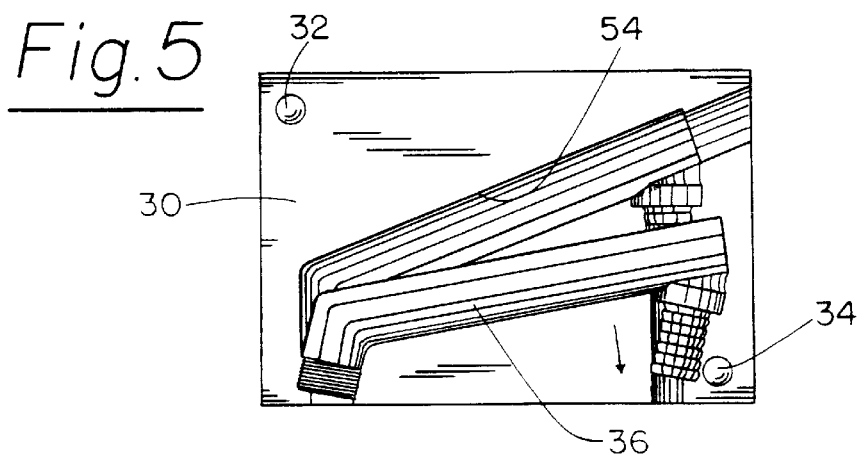

LOOP PIPE AND METHOD OF MANUFACTURE THEREFOR

FIELD OF THE INVENTION

This invention relates generally to fluid handling systems and is particularly directed to a 180° loop pipe for use in redirecting a flowing fluid such as water.

BACKGROUND OF THE INVENTION

In closed fluid handling systems, it is frequently necessary to change the direction of flow of the fluid. One type of fluid handling component is known as a "loop pipe" for changing the direction of flow of the fluid 180°. One common application of this type of fluid handling component is in water irrigation systems. Heretofore, the loop pipe has been formed by mechanically bending a straight section of pipe to form a 180° loop. This approach has been expensive, difficult to reproduce and is labor intensive.

The present invention addresses the aforementioned limitations of the prior art by providing an inventive loop pipe and method of manufacture therefor wherein the loop pipe is made from a unitary casting employing a novel mold arrangement.

OBJECTS AND SUMMARY OF THE INVENTION

Accordingly, it is an object of the present invention to facilitate the manufacture of a 180° loop pipe such as used in closed fluid handling systems.

It is another object of the present invention to provide a novel mold arrangement for casting a unitary loop pipe capable of redirecting fluid flow 180°.

Yet another object of the present invention is to fabricate a 180° loop pipe formed from a single piece casting using a molding process.

This invention contemplates a loop pipe for changing a direction of flow of a fluid 180°, the loop pipe comprising: a first linear end casting member having a first aperture therein defining a first end channel and having first coupling means on an outer surface thereof; a second linear end casting member having a second aperture therein defining a second end channel and having second coupling means on an outer surface thereof, wherein the first and second linear end casting members are aligned generally parallel; a third linear intermediate casting member having a third aperture therein defining a third intermediate channel and having first and second ends respectively connected to the first and second end casting members, wherein the first and second end casting members and the intermediate casting member form a unitary casting and the first and second end channels and the third intermediate channel form a continuous channel for changing the direction of flow of a fluid entering the first end casting member and exiting the second end casting member by 180°, and wherein the third intermediate casting member includes an aperture at one end thereof; and a plug inserted in the end aperture of the third intermediate casting member for sealing the continuous channel.

This invention further contemplates apparatus for forming a loop pipe for changing a direction of flow of a fluid flowing through the loop pipe by 180°, the apparatus comprising: first and second mold members disposed in intimate mutual contact and forming a continuous channel therebetween, wherein the continuous channel includes first and second elongated, linear end channels each having respective first and second ends thereof and a third elongated, linear intermediate channel disposed between and connecting the first and second end channels, and wherein the first and second end channels are aligned generally parallel and the first and second mold members are separable from one another; a first elongated, linear end insert disposed in the first end channel and defining a first annular end cavity between the first insert and the first and second mold members, wherein the first end insert is removable from the first end channel; a second elongated, linear end insert disposed in the second end channel and defining a second annular end cavity between the second insert and the first and second mold members, wherein the first and second annular cavities are aligned generally parallel, and the second end insert is removable from the second end channel; a third elongated, linear intermediate insert disposed in the intermediate channel and defining a third annular intermediate cavity between the third insert and the first and second mold members, wherein the intermediate cavity is connected to and continuous with the first and second end cavities, and wherein the loop pipe is formed by the setting of a material deposited in the cavities in fluid form; and an extension channel coupled to and continuous with the intermediate channel to permit removal of the third intermediate insert from the first and second mold members following casting of the loop pipe within the first and second end cavities and the intermediate cavity.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is an exploded side elevation view shown partially in phantom of a loop pipe in accordance with the present invention;

FIG. 2 is a partially cutaway sectional view of a mold used for fabricating a loop pipe in accordance with the principles of the present invention;

FIG. 3 is an elevation view of the mold arrangement for fabricating a loop pipe in accordance with the present invention;

FIG. 4 is an exploded elevation view of the mold arrangement of FIG. 3 illustrating the removal of the mold inserts from the mold members following the casting of the loop pipe within the mold; and FIG. 5 is an elevation view of one of the mold members used in fabricating a unitary loop pipe casting in accordance with the present invention showing the loop pipe being removed from the mold member.

DETAILED DESCRIPTION OF THE PREFERRED EMBODIMENT

Referring to FIG. 1, there is shown an exploded side elevation view partially in phantom of a loop pipe 10 made from a unitary casting in accordance with the present invention. The loop pipe 10 may be cast from plastic or any of the more commonly used metals such as iron, aluminum or zinc, as its composition will be determined primarily by the application in which it is used. The loop pipe 10 is particularly adapted for changing the flow of water 180°. Thus, water flowing into the loop casting 10 in the direction of arrow 24a will be redirected 180° in the direction of arrow 24b. Similarly, a fluid such as water directed into the loop pipe 10 in the direction of arrow 26b will be redirected in the direction of arrow 26a as it exists the loop pipe.

Loop pipe 10 is made from a single, unitary casting and includes an elongated middle, or intermediate, portion 10a and first and second end portions 10b and 10c. Disposed within the elongated intermediate portion 10a is an intermediate channel or duct 12a, while respectively disposed in the first and second end portions 10b and 10c are first and second end channels 12b and 12c. All of the aforementioned inner channels are shown in dotted line form in FIG. 1, with all three inner channels connected and forming a continuous flow channel between the opposed ends of the loop pipe 10. Disposed on the outer surface of the first end portion 10b are male threads 16, while disposed on the second end portion 10c is a barbed connector 18. The connecting arrangements on each end of the loop pipe 10 facilitate sealed connection of the loop pipe to inlet and outlet pipes, or hoses, which are not shown in the figure for simplicity. Other fluid coupling arrangements, and various combinations thereof, will readily come to mind to one skilled in the relevant art for use in the inventive loop pipe 10. The male thread and barbed connector arrangements 16, 18 are shown in FIG. 1 merely for illustrative purposes and are not intended to limit the present invention to these types of end connectors.

As fully described below and as shown in the various figures which follow, the loop pipe 10 as cast includes a threaded lead-in bore 14 at one end of its elongated intermediate portion 10a. The threaded lead-in bore 14 permits an elongated, linear mold insert to be removed from the loop pipe casting once formed by the inventive casting process, as described below. In order to seal the lead-in bore 14 at one end of the intermediate portion 10a of the loop pipe 10, a pressed-in or threaded end plug 20 is inserted in the lead-in bore to form a seal in the loop pipe so that a flowing fluid travels between opposed ends of the loop pipe and through the respective apertures therein without leaking from the loop pipe.

Referring to FIG. 2, there is shown a partially cutaway sectional view of a mold used for fabricating a loop pipe casting 36 in accordance with the principles of the present invention. FIG. 3 is an elevation view of the mold arrangement shown in FIG. 2, while FIG. 4 is an exploded elevation view of the mold arrangement of FIG. 3. FIG. 5 is an elevation view of one of the mold members used in fabricating a unitary loop pipe casting 36 in accordance with the present invention showing the loop pipe being removed from the mold member 30.

The mold arrangement used for manufacturing a loop pipe casting 36 in accordance with the present invention includes first and second mold members 30 and 31. The first and second mold members 30, 31 each include substantially flat surfaces which are adapted for tight fitting engagement with one another. Each of the substantially flat surfaces of the first and second mold members 30, 31 includes a respective recessed portion, with the pair of recessed portions arranged in facing relation so as to form an inner channel between the two mold members. The inner channel within the two mold members includes three access apertures which extend to the edges of the first and second mold members 30, 31. First and second alignment pins 32 and 34 inserted through the first and second mold members 30, 31 ensure proper alignment of the two mold members in forming the inner channel therebetween.

The inner channel between the first and second mold members 30, 31 defined by the respective facing grooves therein includes first and second linear end channels 39a and 39b and an intermediate channel 39c. The intermediate channel 39c includes first and second end portions and is disposed between and coupled to and continuous with the first and second linear end channels 39a and 39b. The first linear end channel 39a is provided with a threaded inner portion to form a first male threaded end 36a on the loop pipe casting 36 formed between the first and second mold members 30, 31. Similarly, the second linear end channel 39b is provided with a barbed portion for forming a second barbed end 36b on the outer surface of the loop pipe casting 36 formed between the first and second mold members 30, 31.

The first and second linear end channels 39a, 39b are respectively adapted to receive generally cylindrically shaped first and second end insert tools 40 and 42. Each of the first and second end insert tools 40, 42 is adapted for insertion in and removal from a respective end channel. In the embodiment shown in FIG. 2, the first and second end insert tools 40, 42 are shown coupled to a tool cross member 44 to facilitate simultaneous insertion into and removal from the first and second mold members 30, 31 of the first and second end insert tools 40, 42. With the first and second insert tools 40, 42 respectively positioned within the first and second linear end channels 39a, 39b, first and second annular end cavities 46a and 46b are formed within the first and second mold members 30, 31.

The elongated, linear intermediate channel 39c is adapted to receive an elongated, linear intermediate insert tool 38. The intermediate insert tool 38 is adapted for insertion in and removal from the intermediate channel 39c through an aperture in the adjacent edges of the first and second mold members 30, 31. When inserted in the intermediate channel 30c, the intermediate insert tool 38 forms a third annular intermediate cavity 58 between the first and second mold members 30, 31. The third annular intermediate cavity 58 is coupled to and continuous with the first and second annular end cavities 46a and 46b. Access to the third annular intermediate cavity 58 from outside of the mold arrangement with the intermediate insert 38 in position within the mold members is provided via an access aperture 60 shown in FIG. 2 in dotted line form. The material from which the loop pipe casting 36 is to be made is deposited in fluid form in the access aperture 60. The casting material then flows into the third annular intermediate cavity 58 as well as into the first and second annular end cavities 46a, 46b to form the loop pipe casting 36 shown in section in FIG. 2. Once the loop pipe casting 36 hardens, the first and second end insert tools 40, 42 are withdrawn from the mold arrangement in the direction of arrow 52 as shown in FIG. 4. Similarly, the intermediate insert tool 38 is withdrawn from the mold arrangement in the direction of arrow 50 also as shown in FIG. 4. The second mold member may then be separated from the first mold member 30 as shown in FIG. 5, permitting the loop pipe casting 36 to be removed from the recessed portion 54 of the first mold member.

There has thus been shown a loop pipe for redirecting a flowing fluid such as water 180° which is formed by a casting process using a mold and which includes three linear portions formed from a unitary casting. The loop pipe includes a linear intermediate portion and first and second linear end portions each disposed on a respective end of the intermediate portion and forming a continuous inner channel for passing the fluid and changing its direction of flow 180°. The mold arrangement includes first and second mold members into which are inserted three elongated, linear inserts which are removable from the casting once formed between the two mold members to provide the casting with a continuous inner channel for rerouting the fluid 180°. The two end portions of the loop pipe are provided with connecting arrangements such as threads or barbs and the casting is adapted to receive a threaded plug to close the aperture through which the middle insert forming the linear intermediate portion of the loop pipe is removed from the mold arrangement following formation of the casting therein. The loop pipe may be cast from plastic or any of the more commonly used metals such as iron, aluminum or zinc.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A loop pipe for changing a direction of flow of a fluid 180°, said loop pipe comprising:

a first linear end casting member having a first aperture therein defining a first end channel and having first coupling means on an outer surface thereof;

a second linear end casting member having a second aperture therein defining a second end channel and having second coupling means on an outer surface thereof, wherein said first and second linear end casting members are aligned generally parallel;

a third linear intermediate casting member having a third aperture therein defining a third intermediate channel and having first and second ends respectively connected to said first and second end casting members, wherein said first and second end casting members and said intermediate casting member form a unitary casting and said first and second end channels and said third intermediate channel form a continuous channel for changing the direction of flow of a fluid entering said first end casting member and exiting said second end casting member by 180°; and plug means inserted in the third aperture in said third intermediate casting member for sealing said continuous channel.

2. The loop pipe of claim 1 wherein said loop pipe is comprised of plastic, iron, aluminum or zinc.

3. A loop pipe for changing a direction of flow of a fluid 180°, said loop pipe comprising:

a first linear end casting member having a first aperture therein defining a first end channel and having first coupling means on an outer surface thereof;

a second linear end casting member having a second aperture therein defining a second end channel and having second coupling means on an outer surface thereof, wherein said first and second linear end casting members are aligned generally parallel;

a third linear intermediate casting member having a third aperture therein defining a third intermediate channel and having first and second ends respectively connected to said first and second end casting members, wherein said first and second end casting members and said intermediate casting member form a unitary casting and said first and second end channels and said third intermediate channel form a continuous channel for changing the direction of flow of a fluid entering said first end casting member and exiting said second end casting member by 180°, and plug means inserted in third aperture in said third intermediate casting member for sealing said continuous channel, wherein said third aperture and said plug means include respective complementary threaded portions for securely attaching said plug means to said third intermediate casting member in sealing said continuous channel.

4. A loop pipe for changing a direction of flow of a fluid 180°, said loop pipe comprising:

a first linear end casting member having a first aperture therein defining a first end channel and having first coupling means on an outer surface thereof;

a second linear end casting member having a second aperture therein defining a second end channel and having second coupling means on an outer surface thereof, wherein said first and second linear end casting members are aligned generally parallel and said first and second coupling means each include respective barbed or threaded portions on said first and second end casting members;

a third linear intermediate casting member having a third aperture therein defining a third intermediate channel and having first and second ends respectively connected to said first and second end casting members, wherein said first and second end casting members and said intermediate casting member form a unitary casting and said first and second end channels and said third intermediate channel form a continuous channel for changing the direction of flow of a fluid entering said first end casting member and exiting said second end casting member by 180°; and plug means inserted in the third aperture in said third intermediate casting member for sealing said continuous channel.

* * * * *